(12) United States Patent
Denner

(10) Patent No.: US 9,109,624 B2
(45) Date of Patent: Aug. 18, 2015

(54) FLUID TURBINE FLOW METER WITH CENTERING BEARING

(71) Applicant: SAPPEL, Saint Louis (FR)

(72) Inventor: Bruno Denner, Riedisheim (FR)

(73) Assignee: SAPPEL (FR)

( * ) Notice: Subject to any disclaimer, the term of this patent is extended or adjusted under 35 U.S.C. 154(b) by 15 days.

(21) Appl. No.: 14/048,300

(22) Filed: Oct. 8, 2013

(65) Prior Publication Data

US 2014/0096619 A1    Apr. 10, 2014

(30) Foreign Application Priority Data

Oct. 9, 2012   (FR) ...................................... 12 59619

(51) Int. Cl.
| | |
|---|---|
| G01F 1/07 | (2006.01) |
| F16C 23/04 | (2006.01) |
| G01F 1/075 | (2006.01) |
| G01F 1/10 | (2006.01) |

(52) U.S. Cl.
CPC . *F16C 23/04* (2013.01); *G01F 1/07* (2013.01); *G01F 1/0755* (2013.01); *G01F 1/10* (2013.01)

(58) Field of Classification Search
CPC ............. G01F 1/06; G01F 1/065; G01F 1/10; G01F 1/12; G01F 1/07; G01F 1/08; G01F 1/115; G01F 1/075
USPC ............... 73/861.33, 861.82, 861.81, 861.79, 73/861.77, 861.88
See application file for complete search history.

(56) References Cited

U.S. PATENT DOCUMENTS

| | | | | |
|---|---|---|---|---|
| 4,012,957 | A | * | 3/1977 | Chiles et al. ............... 73/861.82 |
| 4,630,488 | A | * | 12/1986 | Marlier et al. ............. 73/861.81 |
| 5,337,615 | A | * | 8/1994 | Goss ........................... 73/861.33 |
| 2014/0102215 | A1 | * | 4/2014 | Denner ....................... 73/861.79 |

FOREIGN PATENT DOCUMENTS

| | | |
|---|---|---|
| DE | 102006002519 A1 | 7/2007 |
| EP | 0100393 A2 | 2/1984 |
| EP | 0607089 A1 | 7/1994 |

OTHER PUBLICATIONS

Jerry S. J. Chen, "On the design of a wide range mini-flow paddlewheel flow sensor", Sensors and Actuators (2000) pp. 1-10, XP004224559.

* cited by examiner

*Primary Examiner* — Jewel V Thompson
(74) *Attorney, Agent, or Firm* — Cantor Colburn LLP

(57) ABSTRACT

A Fluid turbine flow meter, including a measurement chamber, a turbine body that is displaced axially, as a function of the fluid flow rates, between a high position and a low position in the measurement chamber and having a rotation axis, a centering bearing for the rotation axis in the measurement chamber that has a longitudinal body with a longitudinal passage supporting and passed through by the rotation axis, the rotation axis pivoting by being held axially in the measurement chamber, by a first axial end stop in the high position and by a second axial end stop in the low position, the centering bearing having, in the longitudinal passage, at least two cylindrical longitudinal support centering walls for the rotation axis.

10 Claims, 2 Drawing Sheets

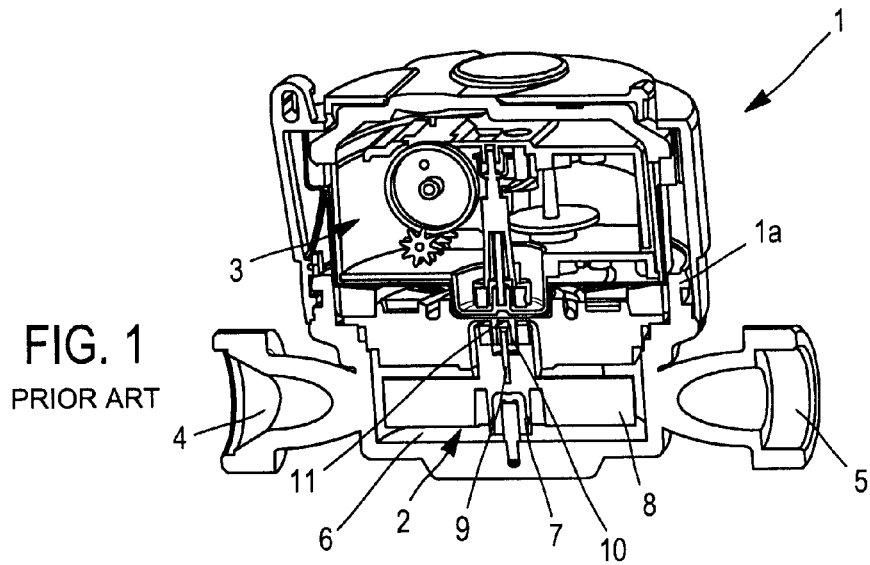
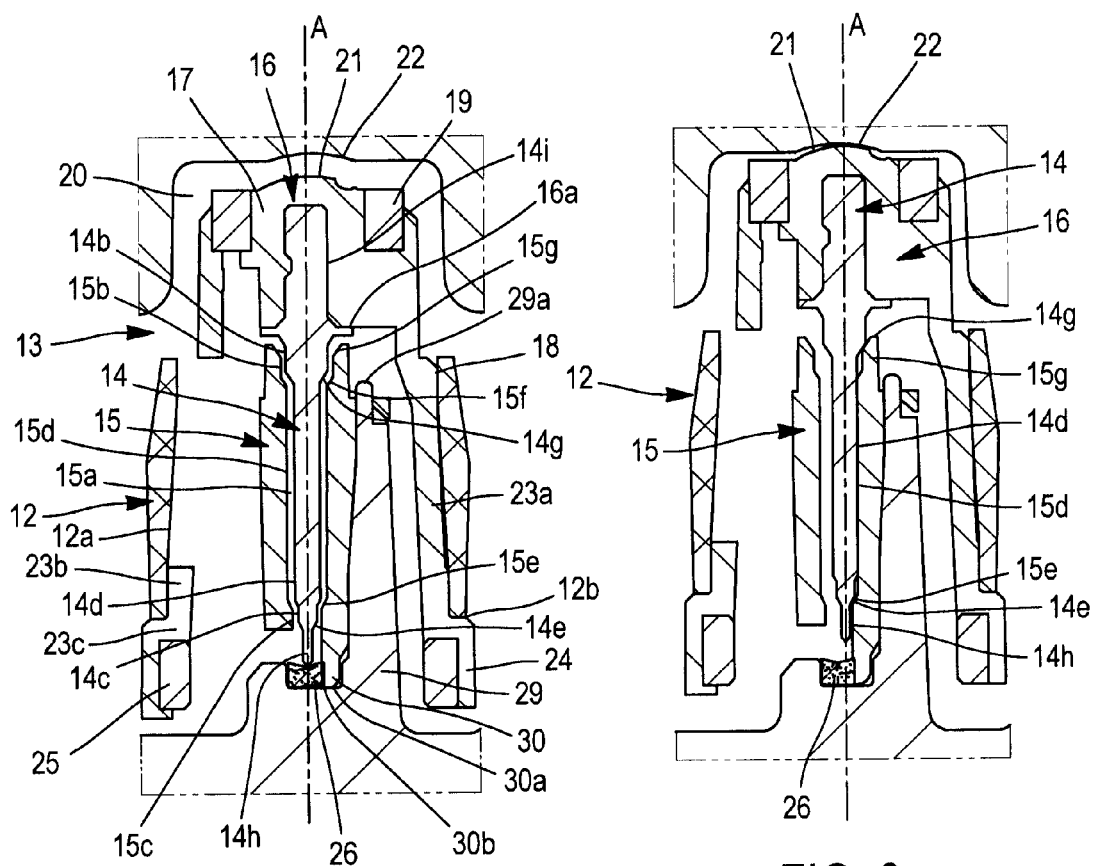

FLUID TURBINE FLOW METER WITH CENTERING BEARING

TECHNICAL FIELD

The present invention relates to the field of fluid turbine flow (or velocity) meters, notably the liquid turbine meters intended to measure water consumption.

More particularly, the invention is particularly suited to a single-jet fluid turbine flow meter or to a multiple-jet fluid turbine flow meter.

BACKGROUND

A fluid turbine flow meter has a housing comprising a measurement chamber into which opens an inlet nozzle and an outlet nozzle, a turbine with blades and driven in rotation in the measurement chamber under the effect of the flow of fluid entering through the inlet nozzle and acting on the blades.

The fluid turbine flow meter also has a housing containing a counter for counting the number of revolutions of the turbine with which the latter is coupled, in the case of a dry counter, by a magnetic transmission, and, in the case of a flooded counter, by a mechanical transmission, and a transparent cover covering the counter.

The rotation axis of the turbine is displaced vertically between two axial end stops when the fluid flow rate exceeds a threshold value. The rotation axis of the turbine pivots on a first axial end stop for flow rates below the threshold value and on a second axial end stop for flow rates above the threshold value, which makes it possible to reduce the wear of the axial end stops and thus improve the performance levels of the meter throughout its life.

However, the use of these two axial end stops does not make it possible to reduce the friction on the centering bearing of the rotation axis in the measurement chamber.

There is a need to find a technical solution that makes it possible to reduce the friction of the rotation axis of the turbine on the centering bearing, particularly when the turbine is rotating at high speed, while ensuring that it is held by the axial end stops.

BRIEF SUMMARY

In this context, the aim of the present invention is to propose a fluid turbine flow meter that is free of the abovementioned limitation.

The fluid turbine flow meter comprises a measurement chamber, a turbine body that is displaced axially, as a function of the fluid flow rates, between a high position and a low position in the measurement chamber and having a rotation axis, a centering bearing for the rotation axis in the measurement chamber that has a longitudinal body with a longitudinal passage supporting and passed through by the rotation axis, the rotation axis pivoting by being held axially in the measurement chamber, by a first axial end stop in the high position and by a second axial end stop in the low position.

According to the invention, in the fluid turbine flow meter, the centering bearing has, in the longitudinal passage, at least two cylindrical longitudinal support centering walls for the rotation axis, the rotation axis being arranged so as to come into contact, in the centering bearing, on a cylindrical longitudinal support centering wall in the high position, and on another cylindrical longitudinal support centering wall, of different cross section, in the low position.

In the preferred embodiment of the invention, the centering bearing has, in the longitudinal passage, two cylindrical longitudinal support centering walls for the rotation axis in the low position.

The centering bearing has, in the longitudinal passage, two end cylindrical support centering walls for the rotation axis in the low position, situated at a top end and at a bottom end of the centering bearing, and a central longitudinal support centering wall for the rotation axis in the high position, situated according to a length of the bearing between the two end cylindrical walls of the centering bearing.

Advantageously, the rotation axis has the form of a pen with a first main wall, a second top wall and a third bottom wall, the cylindrical cross sections of which are arranged to bear longitudinally respectively on the central cylindrical wall in the high position, and on the top end cylindrical wall and on the bottom end cylindrical wall in the low position.

The top end cylindrical support centering wall has a cross section greater than the cross section of the central cylindrical wall, and the bottom end cylindrical support centering wall has a cross section smaller than the cross section of the central cylindrical wall.

The centering bearing comprises tapered contact surfaces for guiding the rotation axis and in that the rotation axis has tapered guiding contact surfaces, complementary to the tapered guiding contact surfaces of the centering bearing.

The turbine body has blades, a sleeve situated and fixed inside the turbine body, the rotation axis being mounted fixed inside the sleeve, the sleeve bearing longitudinally by a top outer surface on the first top axial end stop, in the high position.

Advantageously, the centering bearing has an outer surface that is slightly tapered converging toward its bottom part, a number of arched handles making it possible to support the centering bearing on vertical walls of the measurement chamber that have a finger shape at their end.

The centering bearing has a number of bottom end tabs intended to bear longitudinally on the second bottom axial end stop in the low position.

The bottom end tabs comprise, on their inner walls, a shoulder abutting on the second bottom axial end stop.

The rotation axis is overmolded in the sleeve and has a collar bearing longitudinally on an inner wall of the sleeve.

BRIEF DESCRIPTION OF THE DRAWINGS

Other features and advantages of the invention will emerge clearly from the description which is given thereof below, as an indication and in no way limiting, with reference to the appended drawings, in which:

FIG. 1 represents a slightly perspective view of the interior of a fluid turbine flow meter of the prior art;

FIG. 2 represents a cross-sectional view of a centering bearing, according to the invention, of a rotation axis of the turbine situated in the low position in a measurement chamber;

FIG. 3 represents a cross-sectional view of the centering bearing according to the invention, of the rotation axis situated in the high position;

DETAILED DESCRIPTION

Figure 4:
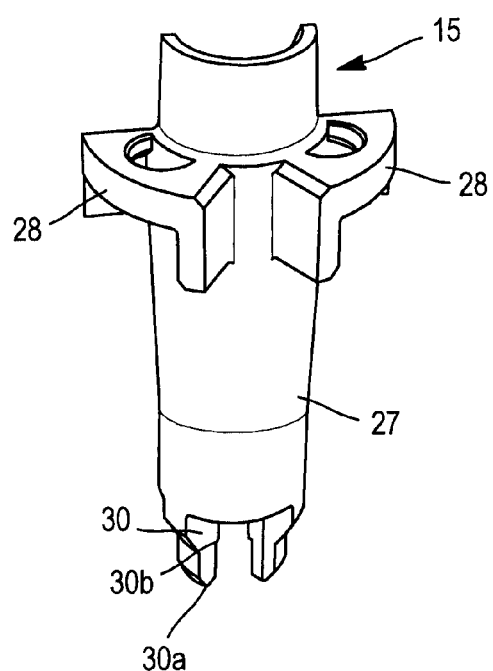
FIG. 4 represents a slightly external view of the centering bearing according to the invention.

The word "fluid" herein below in the description refers to water or any liquid or gas that can be used with the fluid turbine flow meter described hereinbelow.

The FIG. 1 illustrates a single-jet fluid turbine flow meter 1 of the prior art which has a hydraulic part 2 in which the liquid circulates, and a counter 3 where the metering data are displayed.

More specifically, it has a housing 1a for the fluid meter, for example made of bronze or brass, of generally cylindrical form with circular section, having a fluid inlet nozzle 4 and a fluid outlet nozzle 5, on either side of a measurement chamber 6 for measuring the volume of fluid circulating in the inlet nozzle 4 and the outlet nozzle 5.

The measurement chamber 6 has a cylindrical form coaxial to the housing 1a.

The housing 1a comprises the counter 3 in a cylindrical top part, coaxial to the measurement chamber 6 but of larger diameter.

In the bottom of the housing 1a and at the center of the measurement chamber 6, there is a step bearing 7 fitted, around which the moving part 8 of the meter pivots.

The moving part of the meter comprises a turbine body 8 which constitutes the driving element of the fluid meter 1 and which is attached to a vertical axis 9, the turbine 8 having blades driven in rotation in the measurement chamber 6 under the effect of the jet of fluid originating from the inlet nozzle 4 and directed onto a blade.

The vertical axis 9 bears longitudinally on a centering bearing 10 and, as a function of the value of the fluid flow rates in the measurement chamber 6, on a top axial end stop 11.

A transmission, here magnetic, makes it possible to couple the turbine and the counter 3.

Gear mechanisms known from the prior art and linked to the transmission make it possible to count in the counter 3, the number of revolutions made by the turbine 8.

The number of revolutions made by the turbine 8 is displayed by an index which can be mechanical or electronic.

A sealing ring is used to fix the counter 3 on the housing 1a of the measurement chamber 6.

The centering bearing device according to the invention replaces the step bearing 7, the centering bearing 10 and the top axial end stop 11 of the prior art meter.

Furthermore, it applies to any single-jet fluid turbine flow meter or to any multiple-jet fluid turbine flow meter.

Throughout the rest of the description and in the interests of simplicity, reference is made to the longitudinal axis A of the measurement chamber. The term "transversal" designates any dimension extending in a plane perpendicular to the longitudinal axis A and the terms "top" and "bottom", "high" and "low" describe the respective position of the elements described relative to one another, situated along the longitudinal axis A.

As illustrated in FIGS. 2 and 3, the moving part according to the invention of the fluid turbine flow meter, comprises a longitudinal turbine body 12 situated in a measurement chamber 13 and having a rotation axis 14 pivoting in and bearing on a centering bearing 15.

The centering bearing 15 has a longitudinal body passed through by the rotation axis 14 in a longitudinal passage 15a of the bearing supporting the rotation axis 14.

The turbine body 12 has a substantially cylindrical longitudinal main part 12a and blades which are linked to the main part 12a but which are not represented here in the figures.

In FIGS. 2 and 3, the centering bearing 15 has a length substantially equal to that of the main part 12a of the turbine body 12.

The rotation axis 14 is fixed in a sleeve 16.

The sleeve 16 comprises a cylindrical top head 17 and a bottom base 18 inserted and fixed bearing in the turbine body 12.

The top head 17 of the sleeve 16 has a magnet 19 of annular form which makes it possible to produce the magnetic transmission with another magnet which is not represented and situated in the counter facing the magnet 19, which drives the displacement of the gear mechanisms.

The top head 17 is situated in a top cavity 20 of the measurement chamber 13 above the main part of the measurement chamber 13 in which the centering bearing 15 is situated and into which the inlet nozzle and the outlet nozzle open.

The top head 17 has an embossing 21 bearing axially, in the high position, on a first top axial end stop 22 which is here a top wall of the top cavity 20 of the measurement chamber 13.

The hollow bottom base 18 of the sleeve 16 has three top vertical walls 23a, only one of which is represented, and all three of which are linked to a bottom vertical cylindrical wall 23b which is in turn linked by a horizontal wall 23c to a bottom vertical cylindrical wall 24.

This bottom vertical cylindrical wall 24 bears by a cylindrical shoulder on a bottom edge 12b of the main body 12a of the turbine 12, and has a counterweight 25 to balance the rotation of the turbine body 12.

In accordance with the invention, the longitudinal passage 15a has different cylindrical longitudinal support centering walls for the rotation axis 14 as a function of the fluid flow rate value.

The rotation axis 14 is held axially by the first axial end stop 22 of the top part of the measurement chamber 13 in a high position.

The rotation axis 14 bears axially on a second axial end stop 26 in a low position, this second axial end stop 26 bearing on the bottom part of the measurement chamber 13.

The rotation axis 14 bears longitudinally, in the centering bearing 15, on two end centering cylindrical walls 15b, 15c in the low position and on a central centering cylindrical wall 15d in the high position and is displaced between the low position and the high position when the fluid flow rate entering into the intake nozzle reaches the threshold flow rate.

More specifically, the end cylindrical walls 15b, 15c are situated at the top end and at the bottom end of the centering bearing 15, and the central cylindrical wall 15d is situated according to a length of the centering bearing 15 between these two end cylindrical walls 15b, 15c.

In FIGS. 2 and 3, by way of illustration but in a nonlimiting manner, the central support centering cylindrical wall 15d has a support length greater than those of the end centering support cylindrical walls 15b, 15c.

For example, in a nonlimiting manner, the length of the wall can be two to twenty times greater than the lengths of the end cylindrical walls 15b, 15c.

In a variant embodiment not represented, the longitudinal passage 15a comprises a single support centering cylindrical wall in a low position for the first flow rates below the threshold flow rate and a single support centering cylindrical wall in a high position for the second flow rates above the threshold flow rate and of different cross section.

Figure 5:
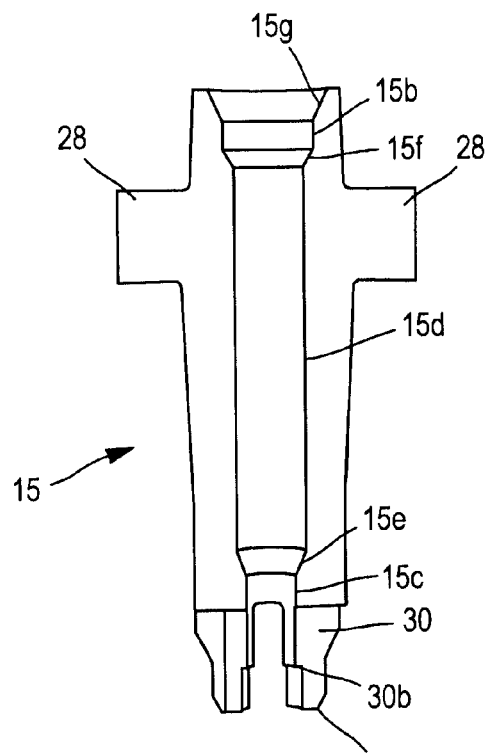
FIG. 5 represents a longitudinal cross-sectional view of the centering bearing according to the invention.

With reference to FIGS. 2, 3 and 5, the central longitudinal support centering cylindrical wall 15d has a cross section smaller than that of the top end longitudinal support centering cylindrical wall 15b, and greater than that of the bottom end longitudinal support centering cylindrical wall 15c.

The central cylindrical wall 15d of the centering bearing 15 is linked to the top end cylindrical wall 15b, respectively to the bottom end cylindrical wall 15c, by a first tapered surface 15e, respectively a second tapered surface 15f.

The top end cylindrical wall of the centering bearing 15 has a third tapered surface 15g.

The first tapered surface 15e and the third tapered surface 15g are contact surfaces that make it possible to guide and support the rotation axis 14 which is displaced and is supported in the centering bearing 15.

The second tapered surface 15f allows for the clearance of the rotation axis 14 relative to the centering bearing 15.

The centering bearing 15 has an outer surface 27 that is slightly tapered converging toward its bottom part, a number of arched handles 28 making it possible to support the centering bearing 15 on vertical walls 29 of the measurement chamber 13 that have at their top end a protruding finger shape 29a in which the arched handle 28 is housed in order to fix the centering bearing 15 to the measurement chamber 13.

As an example, the centering bearing 15 has three arched handles 28, only two of which are represented here.

The centering bearing 15 has a plurality of tabs 30 with a bottom end 30a intended to bear axially on the bottom part of the measurement chamber 13 and on the second bottom axial end stop 26 by a rectilinear shoulder 30b.

The second axial end stop 26 may have an anti-abrasive surface.

As an example, the centering bearing 15 has three tabs 30 with a bottom end 30a, only two of which are represented here.

Figure 6:
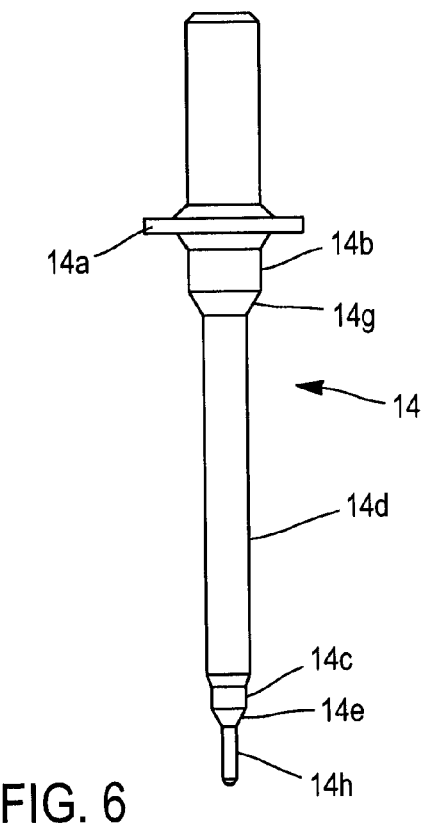
FIG. 6 represents a side view of the rotation axis of the turbine according to the invention, configured to be displaced in the centering bearing.

As illustrated in FIG. 6, the rotation axis 14 has the form of a pen with a first main cylindrical wall 14d, a second top cylindrical wall 14b and a third bottom cylindrical wall 14c having an end part in the form of a spike 14h, the cross sections of which are arranged to bear longitudinally on the top end cylindrical wall 15b and on the bottom end cylindrical wall 15c for the first flow rates, and on the central cylindrical wall 15d for the second flow rates.

The rotation axis 14 has tapered guiding and support contact surfaces 14e, 14g complementary to the tapered guiding and support contact surfaces 15e, 15g of the centering bearing 15.

The rotation axis 14 has a collar 14a bearing axially on an inner wall 16a of the sleeve 16 and can be overmolded in a top cylindrical part 14i of the sleeve 16.

The operation of the centering bearing 15 according to the invention is as follows.

For the flow rates below the threshold flow rate, the rotation axis 14 bears axially on the second axial end stop 26, by its spike 14h.

The rotation axis 14 bears longitudinally by its second top cylindrical wall 14b on the top end support centering cylindrical wall 15b of the bearing 15 and by its third bottom cylindrical wall 14c on the bottom end support centering cylindrical wall 15c of the bearing 15, in the low position.

When the flow rate increases and exceeds a flow rate threshold value, the rotation axis 14 is displaced along the longitudinal axis A in the centering bearing 15, and in the case of the example illustrated, upward to bear longitudinally by its first main cylindrical wall 14d on the right side of the central support centering cylindrical wall 15d of the bearing 15, the force of the flow of fluid pressing it onto this side, in the high position, as illustrated in FIG. 3.

The displacement of the rotation axis 14 is ensured by the guiding of the first and third tapered surfaces 15e, 15g.

Furthermore, these first and third tapered surfaces 15e, 15g also allow for the longitudinal support of the two tapered surfaces 14e, 14g facing the rotation axis 14 in the high position.

The invention claimed is:

1. Fluid turbine flow meter, comprising:
   a measurement chamber,
   a turbine body that is displaced axially in the measurement chamber as a function of fluid flow rates, between a high position and a low position,
   the turbine body having a rotation axis, a centering bearing for the rotation axis in the measurement chamber that has a longitudinal body with a longitudinal passage supporting and passed through by the rotation axis,
   the rotation axis pivoting by being held axially in the measurement chamber, by a first axial end stop in the high position and by a second axial end stop in the low position,
   wherein the centering bearing has, in the longitudinal passage, at least two cylindrical longitudinal support centering walls for the rotation axis, the rotation axis being arranged so as to come into contact, in the centering bearing, on a central cylindrical longitudinal support centering wall in the high position, and on another cylindrical longitudinal support centering wall of cross section different from that of the central cylindrical longitudinal support centering wall, in the low position.

2. Fluid turbine flow meter according to claim 1, wherein the centering bearing has, in the longitudinal passage, two cylindrical longitudinal support centering walls for the rotation axis in the low position.

3. Fluid turbine flow meter according to claim 2, wherein the centering bearing has, in the longitudinal passage, two end cylindrical support centering walls for the rotation axis in the low position, situated at a top end and at a bottom end of the centering bearing, and a central cylindrical longitudinal support centering wall for the rotation axis, in the high position, situated according to a length of the bearing between the two end cylindrical walls.

4. Fluid turbine flow meter according to claim 3, wherein the rotation axis has the form of a pen with a first main cylindrical wall, a second top cylindrical wall and a third bottom cylindrical wall, the cross sections of which are arranged to bear longitudinally respectively on the central cylindrical wall in the high position, and on the top end cylindrical wall and on the bottom end cylindrical wall in the low position.

5. Fluid turbine flow meter according to claim 4, wherein the top end cylindrical support centering wall has a cross section greater than the cross section of the central cylindrical wall, and the bottom end cylindrical support centering wall has a cross section smaller than the cross section of the central cylindrical wall.

6. Fluid turbine flow meter according to claim 4, wherein the centering bearing comprises tapered contact surfaces for guiding the rotation axis and the rotation axis has tapered guiding contact surfaces complementary to the tapered guiding contact surfaces of the centering bearing.

7. Fluid turbine flow meter according to claim 1, wherein the centering bearing has an outer surface that is tapered converging toward its bottom part, a number of arched handles supporting the centering bearing on vertical walls of the measurement chamber that have a finger shape at their end.

8. Fluid turbine flow meter according to claim 1, wherein the centering bearing has a number of bottom end tabs intended to bear longitudinally on the second bottom axial end stop in the low position.

9. Fluid turbine flow meter according to claim 8, wherein the bottom end tabs comprise, on their inner walls, a shoulder abutting on the second bottom axial end stop.

10. Fluid turbine flow meter according to claim 1, wherein the rotation axis is overmolded in a sleeve and has a collar bearing longitudinally on an inner wall of the sleeve.

\* \* \* \* \*